United States Patent [19]

Guch, Jr. et al.

[11] Patent Number: 4,826,304
[45] Date of Patent: May 2, 1989

[54] ADJUSTABLE OPTICAL MOUNTING ASSEMBLY

[75] Inventors: Steve Guch, Jr., Saratoga; John J. Smith, San Jose, both of Calif.

[73] Assignee: GTE Government Systems Corporation, Stamford, Conn.

[21] Appl. No.: 179,612

[22] Filed: Apr. 11, 1988

[51] Int. Cl.⁴ .................. G02B 7/18; G02B 23/08; G02B 23/06

[52] U.S. Cl. .................. 350/618; 350/543; 350/287; 350/540; 350/321; 350/319

[58] Field of Search .................. 350/540–543, 350/569, 574, 632, 634, 636, 319, 321, 582, 589, 590, 618, 623, 626, 486, 287

[56] References Cited

U.S. PATENT DOCUMENTS

| | | | |
|---|---|---|---|
| 1,161,995 | 11/1915 | Styll | 350/543 |
| 2,130,006 | 9/1938 | Gundlach | 350/543 |
| 3,049,972 | 8/1962 | Malinowski | 350/287 |
| 3,509,792 | 5/1970 | Ruf | 350/319 |
| 3,517,554 | 6/1970 | Smith | 350/319 |
| 3,796,478 | 3/1974 | Dierkes | 350/543 |
| 4,088,396 | 5/1978 | Edelstein | 350/252 |
| 4,284,326 | 8/1981 | Durrer et al. | 350/543 |
| 4,655,548 | 4/1987 | Jue | 350/634 |

FOREIGN PATENT DOCUMENTS 667340 11/1938 Fed. Rep. of Germany ...... 350/618

Primary Examiner—Jon W. Henry
Attorney, Agent, or Firm—Douglas M. Gilbert; John F. Lawler

[57] ABSTRACT

An adjustable optical mounting assembly, particularly suited for folding or periscope optics, provides for optical beam motion in three axes using a bearing having a spherical surface. This invention greatly simplifies the mount mechanism and operting procedure, reduces the size, and provides enhanced stability and lockability relative to comparable conventional devices.

5 Claims, 4 Drawing Sheets

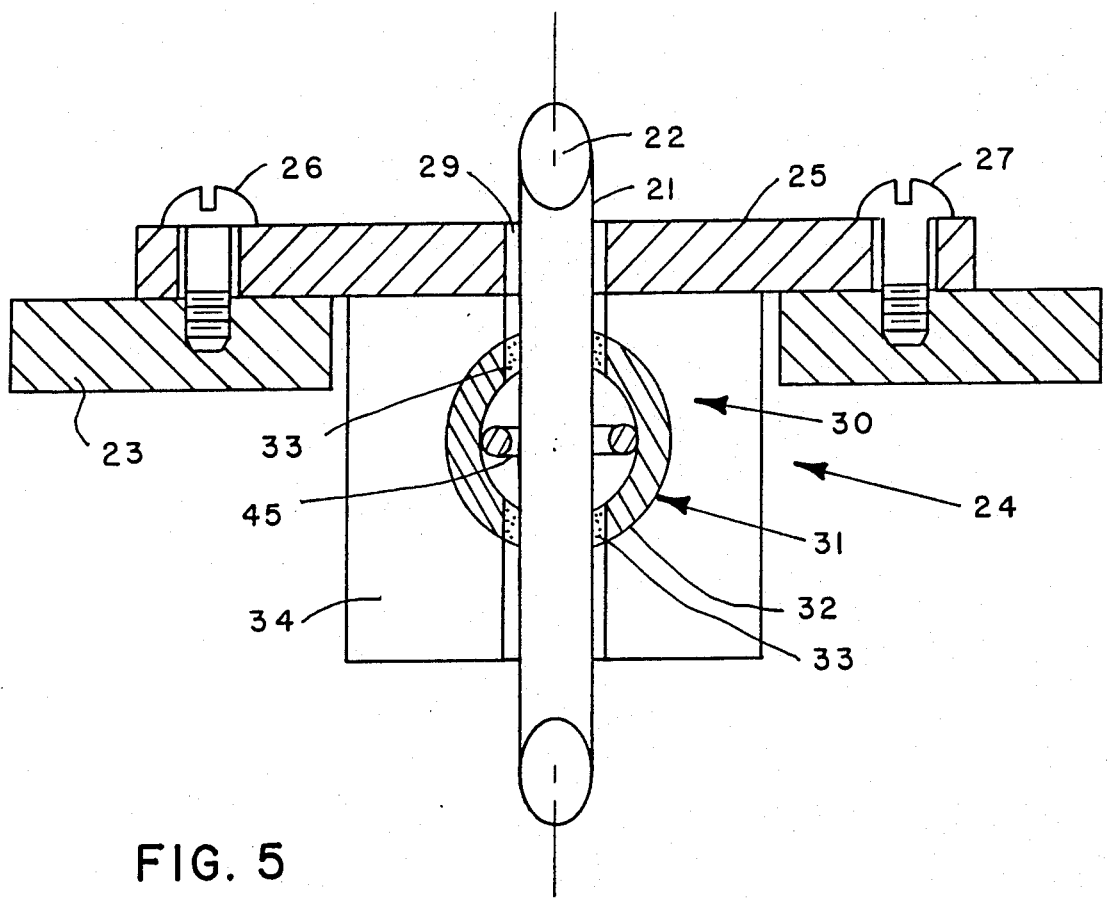
FIG. 5
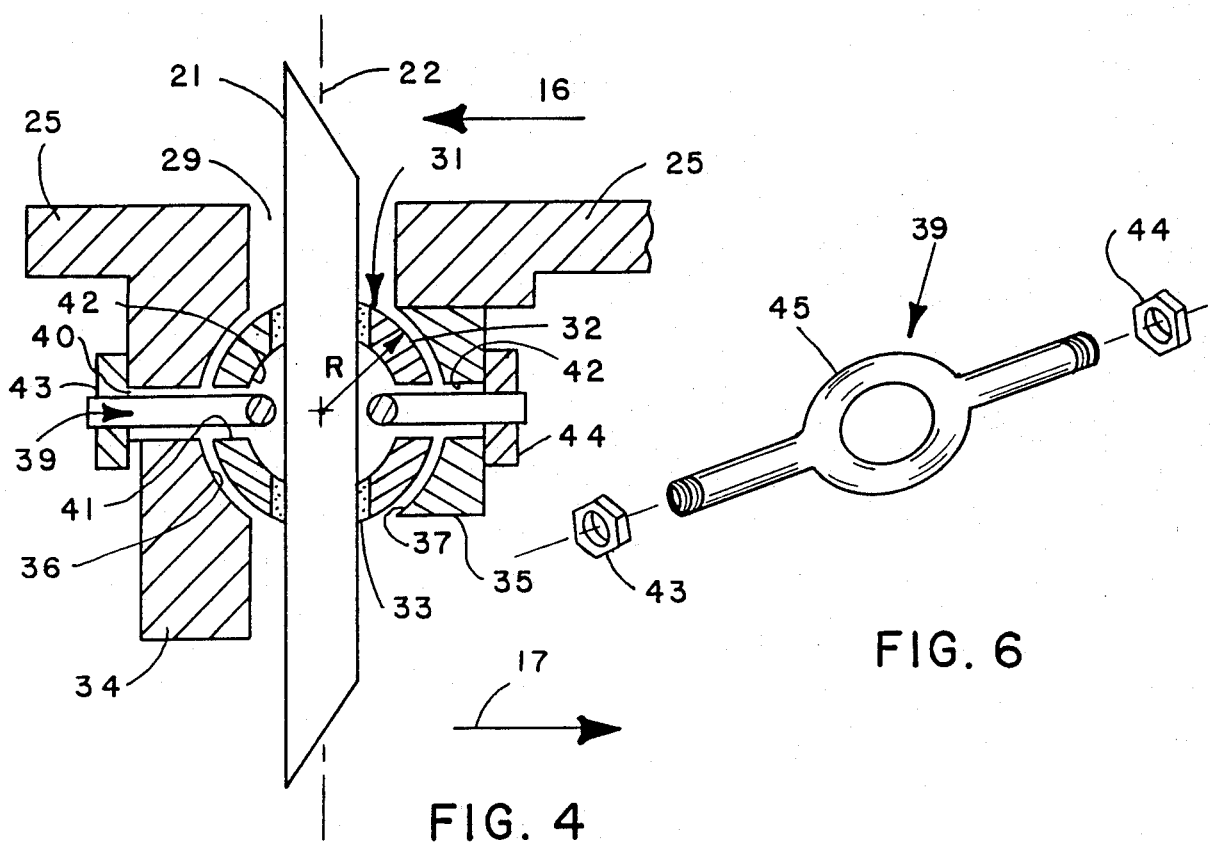
FIG. 4
FIG. 6

ADJUSTABLE OPTICAL MOUNTING ASSEMBLY

BACKGROUND OF THE INVENTION

This invention relates to mounts for optical components such as folding or periscope prisms, and more particularly to an improved mounting assembly for such components.

Prisms, or their equivalents assembled from coated mirrors, are often used in both conventional optics and laser systems. In particular, folding and periscope prisms or optics serve the functions of providing beam translation in space, with nominal 180° and 0° directional reversal respectively. In general, this is accomplished with reflecting surfaces which are orthogonally aligned (a folding prism) or parallel to each other (a periscope prism). In the case of the folding devices, the 45° reflective surfaces provide retroreflection of the beam, when viewed from the side, but only in the plane perpendicular to the 90° faces. In the case of periscopes, the parallel reflecting faces ensure that the output beam is undeviated in angle from the input beam. In most applications, these prisms are employed to take advantage of the stability of the output beam axis orientation against minor perturbations of the input, caused by thermal changes in the structure, etc. Accordingly, the mounts for such devices are generally fabricated to be simple and rigid. The optical elements are simply bonded in place prior to insertion into an optics system, using a fixture which simulates the precision tolerances to which the remainder of the system is fabricated.

The complexity of modern laser systems is extreme, however, particularly when several laser devices must be mounted on a single optical bench or structure. In particular, it may be impractical to establish the positions and angles of the components in the input and exit optical beam lines to the fine precisions (e.g., 10's of microradians in angle or 100's of microns in position) required using solely the adjustment of mechanical tolerances of the components. Such systems do not allow the use of off-line bonding or pre-alignment fixtures, but rather require that adjustments be made after the equipment is assembled.

Because of the shape of periscope and folding optical devices and because they have no mounting points to which attachment/adjustment mechanisms can be readily affixed, provision of in-situ adjustments has been clumsy in the past. An alternative method which has been employed in the past is to position the prisms to nominal values, and utilize separate optical elements (i.e., rotating Risley prism pairs) to adjust beam angle and position. This is undesirable, because of the additional cost, volume, weight, attenuation, and unreliability which inheres in adding such complexity. Another approach has been to replace the monolithic periscope or folding prism structure with one or more adjustable mirror mounts oriented to provide the periscope or fold structures with some in-place adjustability. This approach is also undesirable because the conventional mount designs which are used are invariably large, expensive, and introduce the danger of long-term instability due either to design or assembly defects.

This invention is directed to an optical mounting assembly that overcomes these disadvantages.

OBJECT AND SUMMARY OF THE INVENTION

An object of this invention is the provision of an adjustable mounting assembly for monolithic folding and periscope optics which is simple, compact, and stable in maintaining the desired alignment.

A further object is the provision of a single optical mounting assembly which has three degrees of freedom of optical beam motion.

Another object is the provision of an optical mounting assembly in which complexity is minimized and cost of construction and operation reduced.

A more specific object is the provision of an optical mounting assembly with a single locking mechanism for adjusting and securing the position of the beam translating component along three mutually perpendicular axes.

A further object is the provision of such an assembly in which misalignment resulting from the locking process is minimal.

Still another object is the provision of such a mounting assembly which is compact.

These and other objects of the invention are achieved by use of a mounting assembly with a single spherical mechanical joint between the optical component and the adjacent supporting structure together with a single locking mechanism therefor.

BRIEF DESCRIPTION OF THE DRAWINGS

For a better understanding of the invention as well as other objects and further features thereof, reference is made to the following description which is to be read in conjunction with the accompanying drawings wherein:

FIGS. 4 and 5 are transverse sections of the mounting assembly taken on lines 4—4 and 5—5, respectively, on FIG. 3.

FIG. 6 is a perspective view of the stud and nut showing details of construction.

DESCRIPTION OF PREFERRED EMBODIMENT

Figure 1:
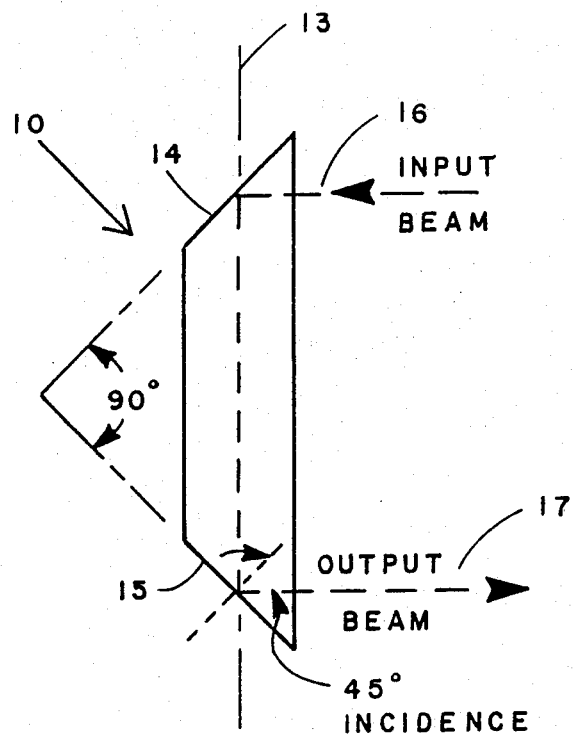
FIGS. 1 and 2 are schematic diagrams of prior art prisms of the type with which the invention may be practiced
Figure 2:
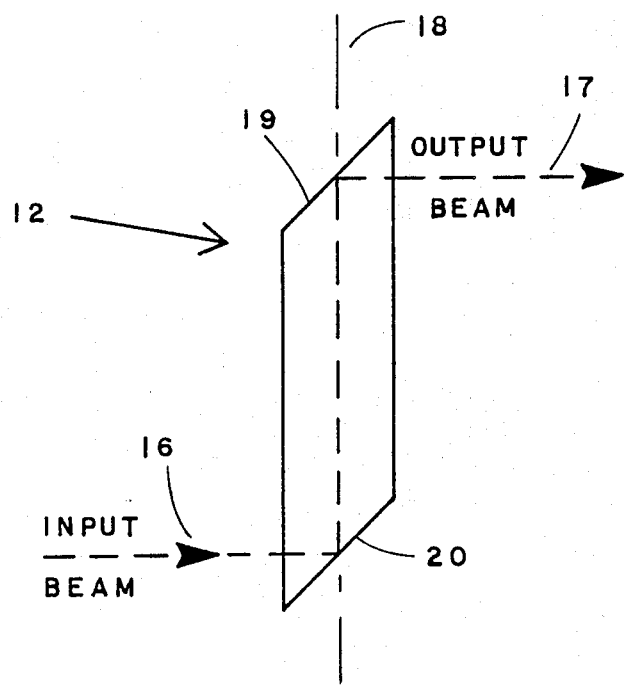

Referring now to the drawings, FIGS. 1 and 2 show elongated optical components 10 and 12 typical of those with which the invention may be practiced with advantage. Component 10 is a folding prism having a longitudinal axis 13 and opposite end surfaces 14 and 15 formed along perpendicular planes. Component 10 may be either a solid block of glass as shown with surfaces 14 and 15 being coated to provide beam deflection or, alternatively, may support a frame holding two mirrors oriented to produce the same effect. An input optical beam 16 incident on surface 14 is reflected 90° and propagates internally along axis 13 to surface 15 where it is again reflected 90° as output beam 17 from the prism in a direction parallel to but opposite from that of input beam 16. Optical component 12 depicted in FIG. 2, is a similarly constructed periscope prism having a longitudinal axis 18 and plane parallel end surfaces 19 and 20 formed at 45° angles to axis 18. An input beam 16' incident on surface 20 is reflected upwardly, as viewed, along axis 18 to surface 19 which reflects it as output beam 17' parallel to and in the same direction of propagation as input beam 16'.

Figure 3:
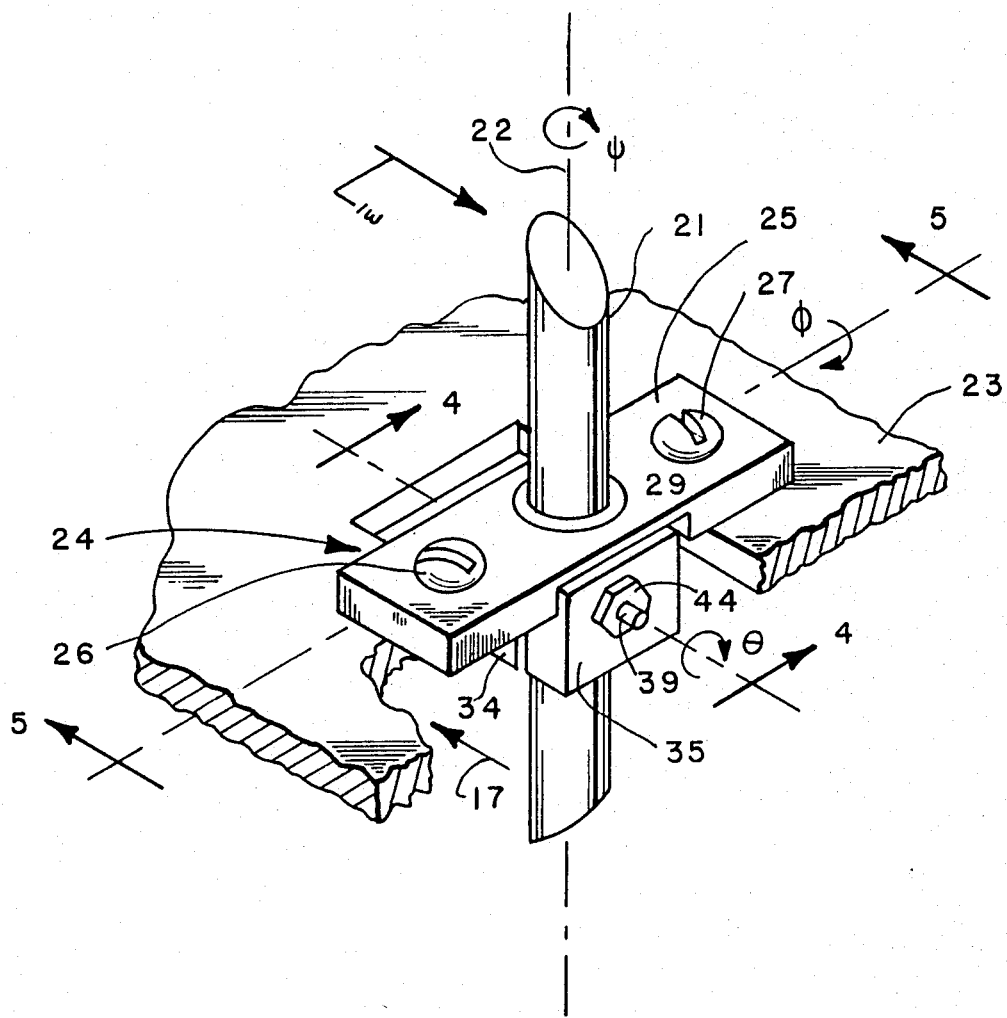
FIG. 3 is a perspective view of a folding prism mounting assembly embodying the invention.

In accordance with this invention, optical component 21, shown in FIGS. 3, 4 and 5 by way of example as a solid cylindrical folding prism similar to component 10 in FIG. 1, has a longitudinal central axis 22 and is secured to a support platform 23 by a mounting assembly 24. Assembly 24 has a base plate 25 secured to platform 23 by screws 26 and 27. Base plate 25 also has a central opening 29 larger than the diameter of component 21 which extends through opening 29 and projects from opposite sides of assembly 24.

In order to mount component 21 on plate 25 so as to provide multiple degrees of freedom of motion, a spherical or ball joint 30 is provided, see FIGS. 4 and 5. Joint 30 comprises an annular collar 31 having a convex spherically shaped external surface 32 and secured by a suitable adhesive 33 to the central portion of component 21, and clamp parts 34 and 35 having concave spherically shaped inwardly facing surfaces 36 and 37, respectively, adjacent to collar 32. The spherically shaped surfaces of collar 32 and of clamp parts 34 and 35 preferably have the same radius R. Clamp part 34 is integral with and depends from base plate 25. Clamp part 35 is a separate piece disposed below plate 25 opposite from part 34 and movable relative thereto.

A stud 39 threaded at opposite ends, see also FIG. 6, extends through openings 40, 41 and 42 in collar 31 and clamp parts 34 and 35, respectively, and projects outwardly from clamp parts 34 and 35 for threaded engagement with nuts 43 and 44, respectively. The central portion of stud 39 comprises an integral ring 45 having an internal diameter slightly larger than that of component 21 and disposed to circumscribe the latter, as shown.

In an alternate embodiment of the invention, component 21 may comprise a hollow frame which supports dielectric mirrors at opposite ends to provide the desired beam deflection.

Figures 7, 8:
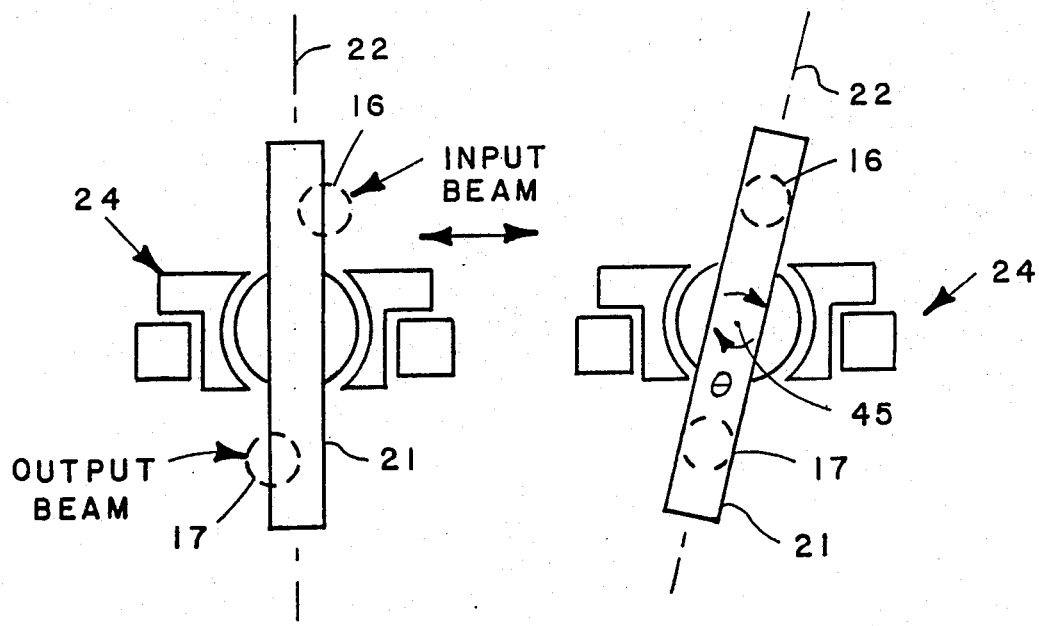
FIGS. 7 and 8 are schematic representations of the mounting assembly shown in FIG. 5 illustrating an optical alignment adjustment along a first axis.

In operation, the entering and exiting optical beams 16 and 17 should initially be located in nominally correct positions. This implies that initially the beam propagation axes are parallel to within approximately 5 milliradians in angle and are located in space to about 0.010 inches of the desired value. Mounting assembly 24 is installed with component 21 in the nominally vertical position as shown in FIG. 7 and is positioned using lateral translation on platform 23 to locate component axis 22 between the positions of the slightly laterally misaligned apertures through which the input and output beams enter and exit the region of component 22. The misalignment of the apertures is greatly exaggerated in the drawing for clarity of description. The following three paragraphs describe the manner in which the three desired optical alignments [i.e., translational beam alignment in the vertical and horizontal directions, and angular beam alignment in the horizontal direction] can be achieved through essentially decoupled motions of the adjustable optical mount.

With nuts 43 and 44 clamp parts 34 and 35 loosely engaging collar 32, component 21 is rotated clockwise in the direction of angle $\theta$, see FIG. 8, about axis 45 (which axis is perpendicular to axis 22) until axis 22 is coincident with the centers of the entrance and exit apertures as shown in the drawing. This provides the required lateral translational adjustment to compensate for aperture offsets.

Figures 9, 10:
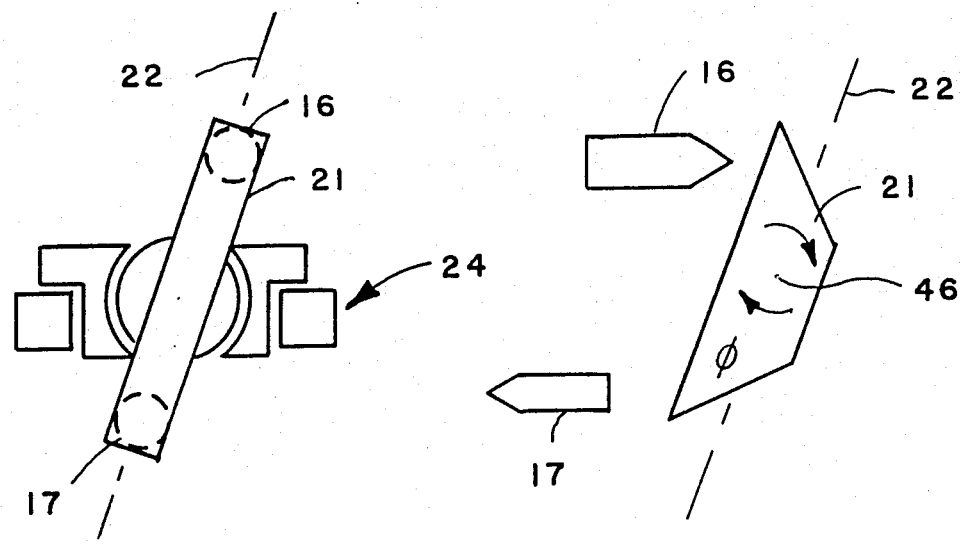
FIGS. 9 and 10 are schematic front and side views of the mounting assembly showing an optical alignment adjustment along a second axis perpendicular to the first axis.

In order to compensate for slight errors in the heights of the input and output beams, component 21 is rotated about axis 46 (perpendicular to axis 22) in the direction of angle $\phi$, see FIGS. 9 and 10. The effect of this movement is to bring the output beam to the desired lateral position. This adjustment is possible because the net vertical offset of component 21 depends on movement in the direction of angle $\phi$. It should be noted that the extent of the offset variation of this angle depends on the particular point chosen as the center of rotation of the ball joint, so that greater or lesser degrees of resolution can be achieved depending on the rotation point chosen.

Figures 11, 12:
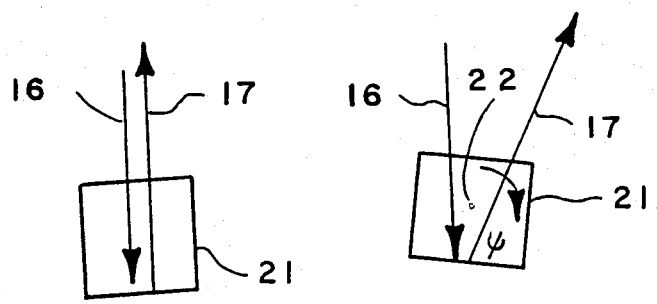
FIGS. 11 and 12 are schematic top views of the mounting assembly showing an optical alignment adjustment along a third (longitudinal) axis perpendicular to the first and second axes.

In the case of the folding optic component only, component 21 may be rotated about its axis 22 in the direction of angle $\psi$ as shown in FIGS. 11 and 12. Since component 21 is never tilted far from the vertical, the effect of this adjustment is to produce angular motion of output beam 17 relative to input beam 16. This provides compensation for any lateral angular misalignment between the two beams. The vertical misalignment in angle due to this motion is insignificant.

Because the system is adjusted with the spherical surfaces of the ball joint in light contact with one another, and because the surfaces are accurately lapped to provide excellent mating over large contact areas, the relative motion of the mating surfaces is smooth. Nuts 43 and 44 are then tightened to lock together mechanically clamp parts 34 and 35 and component collar 32 without disturbing the alignment of component 21. Alternatively, a permanent locking of the parts is achievable by injecting a suitable bonding material, such as 3M Corporation Type 2216 2-part epoxy, between the mating spherical surfaces. Because the running tolerances are very small due to the precision surfaces, no relative beam line misalignment due to the locking process is experienced. For some material surfaces (e.g., identical metals which exhibit a tendency to gall when in contact over large surfaces when clean) or applications (e.g., optical assemblies in deep space where most grease lubricants are not acceptable due to outgassing), it may be necessary to utilize surface finishes (e.g., ion-implanted lead or epoxy-based dry lubricant) which allow the desired smooth motion while still providing the capability for firm locking.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings. More specifically this invention may be extended to optical components and assemblies other than those described above. An example is devices for mounting and adjusting laser cavity mirrors. In such application, the ball joint of this invention provides two angular degrees of freedom with the same benefits in size, reliability, compactness and cost as are realized with folding and periscope optics.

What is claimed is:

1. An adjustable optical mounting assembly comprising:

an elongated optical component capable of transmitting therethrough an optical beam and having beam deflection means at opposite ends thereof whereby an optical beam propagating in one direction and incident on said means on said one end is directed through said component to the other end and is redirected by the other of said means on said other end in a second direction parallel to said one direction;

a base plate having an opening through which said component extends;

said component having an external collar located between said ends thereof, said collar having an outer surface a section of which is spherically shaped surface with a radius R;

said component having a transverse opening therein colocated with said collar;

said base plate having a first clamp part secured thereto, said part having a spherically-shaped surface with a radius R adjacent to said collar and adapted to engage said spherically-shaped surface of the latter, said part having a hole extending therethrough;

a stud having a ring-shaped central portion surrounding said component and having threaded parts projecting from said central portion thereof, one of said threaded parts extending through and projecting from said clamp part;

a second clamp part having a spherically-shaped surface with a radius R adjacent to said collar opposite from said first clamp part, said second part having a hole therethrough adapted to receive the other threaded part of said stud with the proximate threaded end thereof extending outwardly therefrom; and nut means threadedly engaging the outwardly extending portions of said stud for selectively tightening and loosening said clamp parts relative to said collar.

2. The assembly according to claim 1 in which said deflecting means is an optical refracting surface.

3. The assembly according to claim 1 in which said deflecting means is an optical reflecting surface.

4. An adjustable optical mounting assembly for changing the position of an elongated optical component along three mutually perpendicular axes, one of said axes constituting the central longitudinal axis of said component, said assembly comprising:

a base plate having an opening through which said component extends, said base plate having a first clamp part projecting from one side thereof adjacent to said opening, said clamp part having a spherically shaped surface with a radius R;

a second clamp part spaced from and positioned oppositely to said first clamp part, said second clamp part having a spherically shaped surface with a radius R facing said surface of said first clamp part;

said component having an external collar secured thereto, said collar having a spherically shaped surface with a radius R and being disposed between and proximate to said surfaces of said first and second clamp parts;

means for releasably tightening said clamp parts against said collar whereby selectively to permit rotation of said component about each of said three axes, comprising a stud extending between said clamp parts, and means releasably engaging said second clamp part for increasing and decreasing a clamping force between said clamp parts and said collar.

5. The assembly according to claim 4 in which said component comprises a transparent substance capable of transmitting a light beam therethrough said stud having a central ring portion around said component.

* * * * *